BENJAMIN EISENBERG
ELLINGTON M. MAGEE   INVENTORS

United States Patent Office 3,427,152
Patented Feb. 11, 1969

3,427,152
PRODUCTION OF MAGNESIUM BY THERMAL TREATMENT OF MAGNESIUM OXIDE UTILIZING COUNTERCURRENTLY FLOWING HOT INERT GAS
Benjamin Eisenberg, Parsippany, and Ellington M. Magee, Scotch Plains, N.J., assignors to Esso Research and Engineering Company, a corporation of Delaware
Filed Dec. 9, 1965, Ser. No. 512,686
U.S. Cl. 75—67                         8 Claims
Int. Cl. C22b 5/04, 45/00

ABSTRACT OF THE DISCLOSURE

Magnesium is produced by the thermal treatment of a mixture of magnesium oxide and a reducing agent wherein the necessary heat is imparted by a preheated inert gas which is countercurrently flowed with respect to the magnesium oxide. A preferred inert gas comprises hydrogen utilized in a shaft kiln wherein the magnesium is withdrawn from an intermediate point and condensed.

---

The present invention is broadly concerned with the production of high quality magnesium. The invention is more particularly concerned with the thermal treatment of magnesium oxide utilizing a particular technique and apparatus wherein the magnesium is continuously produced by the condensation of magnesium vapor from a hydrogen stream. Specific desirable adaptations of the present invention are the use of external heating with the transfer of heat by an inert gas and the use of briquetted feed.

Figure 1:
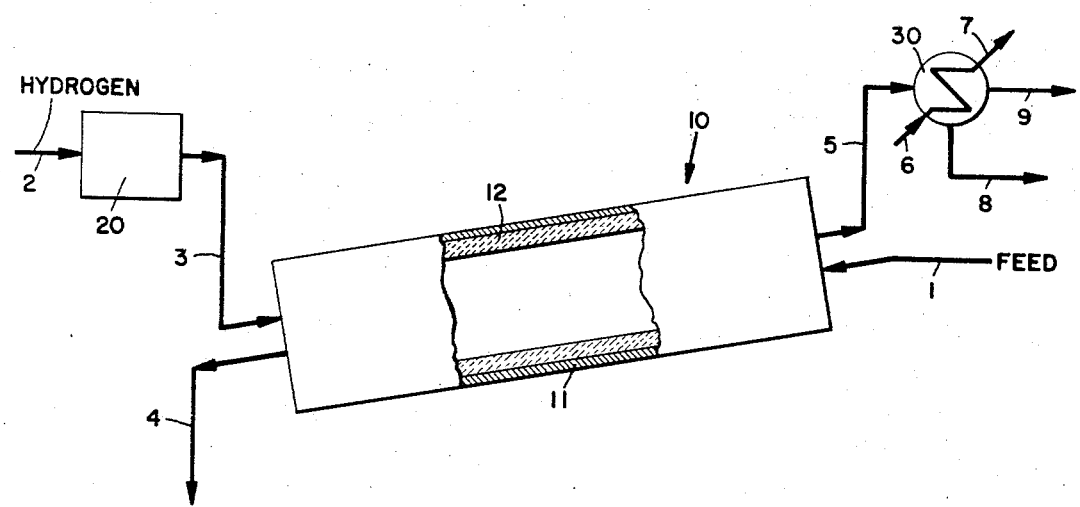
Figure 2:
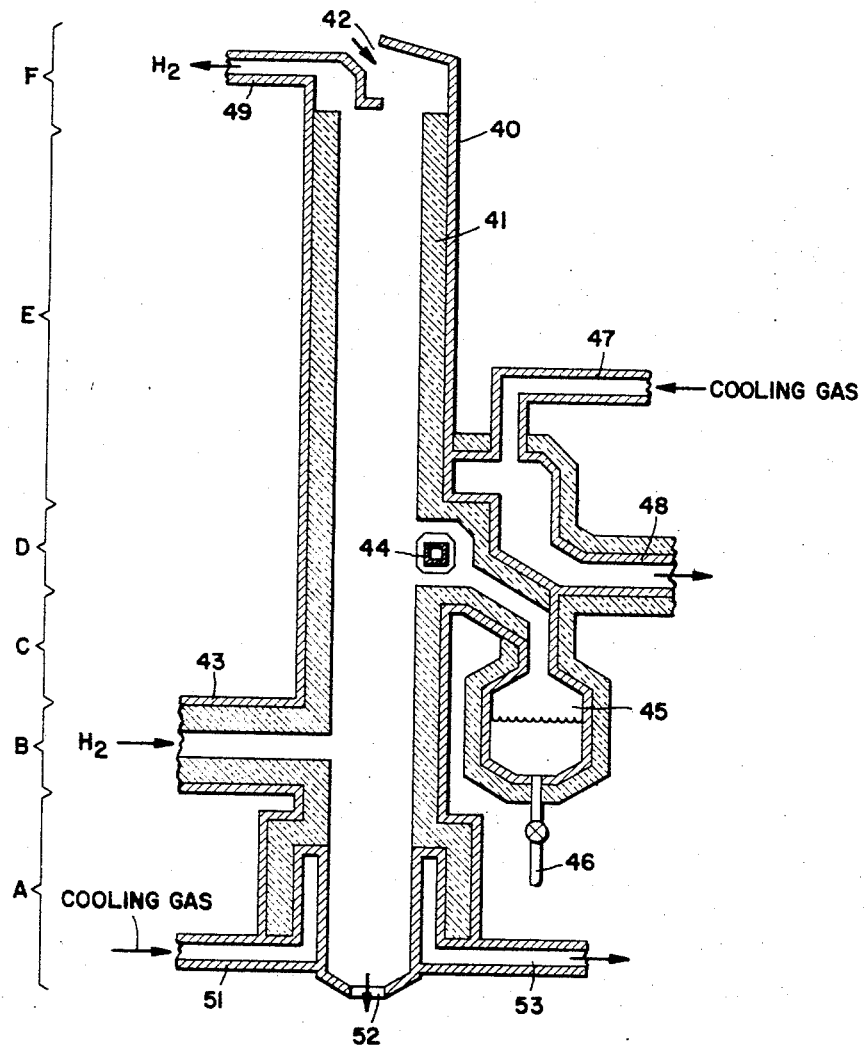

It is known in the art that present thermal methods for the production of magnesium are batch operations wherein a high vacuum is utilized. In accordance with the present invention, magnesium is continuously produced by condensing magnesium vapors from a hydrogen stream. The invention may be readily understood by reference to the figures illustrating embodiments of the same. FIGURE 1 illustrates a rotating calciner adaptation while FIGURE 2 is a diagrammatical sketch relating to a preferred shaft kiln.

Referring specifically to FIGURE 1, a feed material comprising magnesium oxide is introduced into a rotating calciner 10 by means of line 1. The feed is a material containing magnesium oxide, such as calcined dolomite or dead burned magnesite. The feed material also contains a suitable reducing agent such as aluminum, silicon, aluminum-silicon alloy, ferrosilicon, aluminum carbide, calcium carbide, calcium-silicon alloy, or mixtures or alloys of these.

The reducing agent is present in sufficient quantity to reduce stoichiometrically the magnesium oxide to magnesium, plus sufficient excess to reduce impurities such as $Fe_2O_3$. An excess (up to Ca 10% excess) may be added to increase the rate if desired. It has been found that an aluminum-silicon alloy or mixture in which the mole ratio of aluminum to silicon is 2:1 gives especially desirable results. When this alloy is used as reducing agent, a mixture is made which contains MgO/Al/Si in the ratio 5/2/1. When impurities are present such as $Fe_2O_3$ in calcined dolomite, sufficient excess Al-Si alloy is added to effect reduction of the $Fe_2O_3$. One example involves a calcined dolomite having the composition by weight:

| | Percent |
|---|---|
| MgO | 37.6 |
| CaO | 53.9 |
| $SiO_2$ | 6.3 |
| $Fe_2O_3$ | 1.6 |

One hundred parts by weight of this material are mixed with 20.2 parts of an aluminum-silicon alloy having a molar ratio of aluminum to silicon of 2 to 1 (i.e., contains 65.8% Al and 34.2% Si by weight). Depending on the cost of materials involved, in some cases the amount of reducing agent is increased to increase rates of reaction or in others it may be decreased to conserve reducing agent.

Another excellent feed mixture is that obtained by mixing the alloy with a MgO-containing material, such as dolomite, so that the amount of aluminum in the alloy is stoichiometrically equivalent to the magnesium content of the ore. For example, 100 parts by weight of calcined dolomite with the above composition is mixed with 25.4 parts by weight of the above-mentioned aluminum-silicon alloy. In this case, the silicon remains unreacted and can be recovered by dissolving in a molten metal such as iron.

The magnesium oxide and reducing agent are ground, mixed together, formed into briquettes, and heated to a temperature in the range from about 900° to 1300° F., preferably about 1100° F., prior to introducing the same into calciner 10. The calciner 10 consists of a cylindrical metal tube 11 which is capable of withstanding temperatures in the range from about 2000° to 2200° F. The calciner 10 rotates within a stationary cylindrical furnace (not shown). A special feature of the present process is that metal tube 11 is lined with refractory brick 12 as in a direct-fired rotating kiln. Thus, the inside of this unit is capable of withstanding temperatures considerably above 2000° F. as long as the metal temperature remains below about 2000° F. The indirectly fired, rotating calciner is controlled so that the rotating metal tube temperature remains below about 2000° F.

In accordance with the present invention, hydrogen is introduced into zone 20 by means of line 2 wherein the temperature of the same is raised to about 2300° F. to 3500° F., such as about 2800° F., by any suitable method, such as passing the hydrogen through a fuel-fired furnace and then over electrical resistance heaters located in the gas entrance tube positioned in zone 20. The hot hydrogen is removed from zone 20 by means of line 3 and passed into the lower end of calciner 10. Reducing agents such as aluminum, silicon, aluminum-silicon alloy, ferrosilicon, aluminum carbide, calcium carbide, calcium-silicon alloy, or mixtures or alloys of these may be used. This mixture passes downwardly through calciner 10 and contacts the upflowing, hot hydrogen. Feed material, free of magnesium, is withdrawn from the lower end of calciner 10 by means of line 4 and suitably handled as desired so as to utilize the heat associated therewith.

The hot hydrogen at a pressure above about 1 atmosphere, in the range from about 1 to 10 atmospheres, such as about 1.5 atmospheres, countercurrently contacts the downflowing briquettes raising the briquette temperature to a temperature in the range from about 2200° to 2800° F. Under these conditions, magnesium vapor is released from the feed and flows upwardly through calciner 10 along with the hydrogen stream. The gaseous or vaporous mixture is removed from the upper end of calciner 10 by means of line 5, passed through a condensing zone 30 which is maintained at a pressure in the range from about 1 to 10 atmospheres, such as about 1.5 atmospheres, and at a temperature in the range from about 1200° to 1300° F., such as about 1250° F. These temperatures are secured by a cooling medium introduced into zone 30 by means of line 6 and withdrawn by means of line 7. Under these conditions, magnesium vapor condenses as a liquid and is removed from zone 30 by means of line 8 and further handled as desired. The hydrogen is removed from zone 30 by means of line 9 and preferably recycled to zone 20 and to the system.

Another technique for carrying out the invention is illustrated in FIGURE 2. Referring specifically to FIG- URE 2, shaft furnace 40 is lined with a suitable insulating material 41, such as carbon or MgO. In accordance with the present invention, magnesium oxide or dolomite, serpentine, etc. is introduced into the upper end of furnace 40 along with alloys of aluminum, silicon, or other metals through opening 42. Other alloys such as Al-Si alloys, Ca, Ca-Si, $Al_4C_3$, and $CaC_2$ may be used.

Hydrogen is heated to a temperature in the range from 2000° to 3500° F., preferably about 2800° F., in a suitable furnace. It has been discovered that two types of heating are most efficient. The first type consists of a pebble bed furnace in which conventional fuels are burned with preheated air or oxygen. The use of two or more such furnaces allows cycling so that one is heated while the other is transferring its heat to the hydrogen stream. The second method of heating involves raising the hydrogen to about 1600° F. with a conventional furnace and then supplying the heat to raise the hydrogen to the desired reaction temperature by electrical heating, either resistance heating or induction heating.

It has been found that by supplying the necessary heat to the moving solids by a hot hydrogen stream, it is possible to overcome one of the main problems that has made previous attempts to carry out similar reactions very impractical. This is the problem of heat transfer. Others have attempted to heat the solids directly by electrical heating or other means, but it is very difficult to put enough heat into a large bed by this means without having unduly long residence times. If the temperature of the electrical heating element is raised to a very high temperature to cause a large temperature gradient, then sintering or even melting of the solids occurs in the vicinity of the heat source and the kiln becomes plugged. Also, it is difficult to find cheap materials for heating elements which will not react with the moving solids at the high temperatures necessary at the element surface. Carbon, for example, tends to react with MgO at temperatures above about 2900° F. Metals tend to alloy with the Al or Si in the feed. The use of external heating with transfer to the solids by means of hot hydrogen removes these difficulties and makes the practice of metallo-thermic magnesium generation possible on a large scale. At the same time the hydrogen acts to sweep the magnesium from the kiln and maintain a pressure above one atmosphere so that a vacuum is not necessary.

The hot hydrogen is introduced into the lower area of furnace 40 by means of conduit 43. The hydrogen enters the shaft furnace at section B and moves upwardly countercurrently contacting downflowing feed. The reactants which were introduced into the top of furnace 40 were thoroughly mixed such as by grinding and briquetting.

It has been found that the use of briquetted feed removes a problem that is present in previous attempts to operate similar kilns. This is the problem of sintering. Others have attempted to mix powdered reducing agents with fine magnesium oxide containing ores and to feed the powdered material into kilns. When such mixtures are used, the reducing agents melt and bridge the gaps between the particles of the ore. When reaction occurs, the whole mass tends to sinter, thus making operation very difficult. Thus, when the mixed powders are first briquetted and broken into particles of about 1/16 inch to 1 inch in diameter, the reducing agent melts within the particles of ore. There is very little bridging and a smooth flow of solids results.

These reactants move downwardly as in a lime furnace. Under the conditions of operation the hottest portion of the solids exists in section C immediately above the point of introduction of the hot hydrogen. The reaction occurs in section C wherein magnesium vapor is driven off by the hot hydrogen or other inert gas such as argon. Other gases, such as helium and neon, may be used.

The temperature of the entering hydrogen or inert gas is adjusted to obtain the hottest temperature possible in section C without causing excessive sintering of the feed solids. The particular mixture has a temperature at which it sinters. For example, $5MgO \cdot 2Al \cdot Si$ can be reacted at 2200° F. without sintering, but cannot be reacted at 2900° F. The hydrogen must then be somewhat cooler than 2900° F.

After passing through reaction area C the hydrogen mixed with gaseous magnesium bypasses the downflowing solids in section D. The gases go through the condenser 44 connected next to section D where heat is removed from the gas and magnesium is condensed as a liquid and flows into collecting area 45. The presence of the solids causes a pressure drop of ¼ p.s.i./ft. of bed height. This pressure differential causes the hydrogen to flow through section D where there is much less impedance to flow. A height of two to four feet is sufficient to remove the gas through section D. Small amounts seeping up through the bed cause no difficulty as the Mg condenses on the downward moving solids and is returned to the hot zone where it is picked up again.

Magnesium is withdrawn from zone 45 by means of line 46 and further handled as desired. Cooling is secured in exchanger 44 by the introduction of cooling gas through conduit 47 and withdrawal of the same through conduit 48.

The heat exchanger may be any one of several known types such as metal, liquid magnesium spray, and the like. The flow of gases through the bypass is determined by the height of section D and this is designed according to the rate of movement of gas through the reactor.

The upflowing cooled hydrogen is removed from furnace 40 by means of line 49, preferably reheated and recycled to the system. The downflowing solids below the point of introduction of the hot hydrogen flow into area A where the same are cooled by the introduction of cooling gas by means of conduit 51. The cooling gas may be the cooled gas from 49. This cooling step serves to preheat the gas before it goes to the primary heat source. Solids free of magnesium are withdrawn from the lower area of furnace 40 through opening 52. These cooling gases flow around a jacketed area and are removed by means of conduit 53 and may be subsequently used in a secondary heat neutralization system.

What is claimed is:

1. Process for the production of magnesium from a material containing magnesium oxide which comprises introducing said material and a reducing agent into one end of a reaction zone, introducing a hot inert gas heated to a temperature in the range from about 2300° to 3500° F. into the other end of a reaction zone, counterflowing said inert gas with respect to said magnesium oxide, maintaining the reaction zone at a temperature in the range from about 2000° to 2800° F., and at a pressure in the range from about 1 to 10 atmospheres, withdrawing magnesium vapor from said reaction zone and condensing the same to form magnesium liquid.

2. Process for the production of magnesium from a material containing magnesium oxide which comprises introducing said material and a reducing agent into one end of a reaction zone, introducing hydrogen which is heated to a temperature in the range from about 2300° to 3500° F. into the other end of said reaction zone, said hydrogen counterflowing with respect to said magnesium oxide, whereby the reaction zone is maintained at a temperature in the range from about 2000° to 2800° F. and at a pressure in the range of from about 1 to 10 atmospheres, withdrawing magnesium vapor from said reaction zone and condensing the same to form magnesium liquid.

3. Process as defined by claim 2 wherein said material containing magnesium oxide and said reducing agent introduced into said one end of said reaction zone are ground, formed into briquettes, and heated to a temperature in the range from about 900° F. to 1300° F. prior to introducing the same into one end of said reaction zone.

4. Process for the production of magnesium from magnesium oxide which comprises introducing magnesium oxide and an alloy reducing agent into the top of a shaft furnace, maintaining said shaft furnace at a temperature in the range from about 2000° to 2800° F. and at a pressure of above 1 atmosphere, introducing a hot inert gas into the lower end of said shaft furnace and causing said gas to countercurrently flow upwardly with respect to the down moving magnesium oxide, withdrawing magnesium vapor from an intermediate point of said shaft furnace, passing the same to a condensation zone, and cooling the same to a temperature in the range from about 1200° to 1300° F. whereby said magnesium vapor will condense to a magnesium liquid, withdrawing said magnesium liquid from said condensation zone, withdrawing said hot inert gas from the top of said shaft furnace and recycling the same to the system.

5. Process as defined by claim 4 wherein said inert gas is hydrogen which is heated to a temperature in the range from about 2300° to 3500° F. whereby the necessary heat will be imparted to said down moving magnesium oxide.

6. Process as defined by claim 5 wherein said reducing agent consists of an aluminum-silicon alloy.

7. Process as defined by claim 6 wherein said aluminum-silicon alloy has a mole ratio of two aluminum to one silicon.

8. Process as defined by claim 7 wherein the magnesium oxide-aluminum-silicon mole ratio is about five magnesium oxide to two aluminum to one silicon.

References Cited

UNITED STATES PATENTS

| | | | |
|---|---|---|---|
| 1,239,178 | 9/1917 | Grosvenor | 75—67 X |
| 1,955,964 | 4/1934 | Kemmer | 75—67 |
| 2,022,282 | 11/1935 | Hansgirg | 75—67 |
| 2,025,740 | 12/1935 | Hansgirg | 75—67 |
| 2,111,661 | 3/1938 | Ebner | 75—67 |
| 2,237,011 | 4/1941 | Pokorny | 75—67 |
| 2,255,549 | 9/1941 | Kruh | 75—68 |
| 2,362,718 | 11/1944 | Pidgeon | 75—67 X |
| 2,393,080 | 1/1946 | Waring | 75—67 |
| 2,558,744 | 7/1951 | Fouquet | 75—67 |
| 3,264,097 | 8/1966 | Weiss | 75—67 |

L. DEWAYNE RUTLEDGE, *Primary Examiner.*

H. W. TARRING, *Assistant Examiner.*

U.S. Cl. X.R.

75—89